United States Patent
Al-Dossary et al.

(10) Patent No.: US 9,128,203 B2
(45) Date of Patent: Sep. 8, 2015

(54) RESERVOIR PROPERTIES PREDICTION WITH LEAST SQUARE SUPPORT VECTOR MACHINE

(75) Inventors: Saleh Al-Dossary, Dammam (SA); Jinsong Wang, Dhahran (SA); Nasher M. Albinhassan, Dammam (SA); Husam Mustafa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 475 days.

(21) Appl. No.: 13/618,327

(22) Filed: Sep. 14, 2012

(65) Prior Publication Data
US 2013/0080066 A1    Mar. 28, 2013

Related U.S. Application Data

(60) Provisional application No. 61/540,263, filed on Sep. 28, 2011.

(51) Int. Cl.
*G01V 1/28* (2006.01)
*G01V 1/30* (2006.01)

(52) U.S. Cl.
CPC ............ *G01V 1/282* (2013.01); *G01V 1/306* (2013.01)

(58) Field of Classification Search
CPC .......... G01V 1/282; G01V 1/28; G01V 1/306
USPC .............................................. 702/11; 703/10
See application file for complete search history.

(56) References Cited

FOREIGN PATENT DOCUMENTS

WO    2004104637 A1    12/2004

OTHER PUBLICATIONS

Yexin Liu, Anisotropic Reservoir Characterization Based on Support Vector Machine Technique, 2008 CSPG CSEG CWLS Convention, pp. 354-357.*
International Search Report and Written Opinion, PCT/US2012/055711, mailed Aug. 22, 2013.
Duan-Nan et al. "Application of support vector machine in prediction of reservoir parameters" Signal Processing (ICSP), 2010 IEEE 10th International Conference, Piscataway, NJ, Oct. 24, 2010, pp. 2539-2542.
Al-Anazi et al. "Support vector regression for porosity prediction in a heterogeneous reservoir: A comparative study" Computers & Geosciences, Pergamon Press, Oxford, GB, vol. 36, No. 12, Dec. 1, 2010, pp. 1494-1503.
Hall, Mark A. "Correlation-based Feature Selection for Machine Learning" PhD Thesis, The University of Waikato, Dept. of Computer Science, Hamilton, NZ, Apr. 1, 1999, pp. 4 and 51-74.

* cited by examiner

*Primary Examiner* — Toan Le
(74) *Attorney, Agent, or Firm* — Bracewell & Giuliani LLP; Constance G. Rhebergen; Albert B. Kimball, Jr.

(57) ABSTRACT

Subsurface reservoir properties are predicted despite limited availability of well log and multiple seismic attribute data. The prediction is achieved by computer modeling with least square regression based on a support vector machine methodology. The computer modeling includes supervised computerized data training, cross-validation and kernel selection and parameter optimization of the support vector machine. An attributes selection technique based on cross-correlation is adopted to select most appropriate attributes used for the computerized training and prediction in the support vector machine.

27 Claims, 10 Drawing Sheets

RESERVOIR PROPERTIES PREDICTION WITH LEAST SQUARE SUPPORT VECTOR MACHINE

CROSS REFERENCE TO RELATED APPLICATIONS

This application claims priority from U.S. Provisional Application No. 61/540,263, filed Sep. 28, 2011. For purposes of United States patent practice, this application incorporates the contents of the Provisional Application by reference in entirety.

BACKGROUND OF THE INVENTION

1. Field of the Invention

The present invention relates to computerized simulation of hydrocarbon reservoirs in the earth, and in particular to determination of reservoir attributes or properties as reservoir models when there is a limited amount of well log data available.

2. Description of the Related Art

Predicting reservoir properties out of seismic attributes where only a few wells are present in the reservoir has been a common challenge in oil industry to provide an initial reservoir characterization for reservoir modeling and evaluation. Conventionally, geo-statistics and neural networks have been used to predict well log properties from combinations of various seismic attributes. Known well-to-seismic ties have been used to learn the relationship between the seismic data and the well values. Recently, multiple seismic attributes have been used to predict well log properties via modeling techniques based on learning the relationship between the wells and seismic attributes. However, for small populations (i.e., only a few well-seismic attribute pairs), statistical significance has in some cases been impossible to achieve. The use of this technique was, however, dependent on or limited by the number of wells actually present in the reservoir.

Due to the limited availability of drilled wells, the reservoir petro-physical characteristic modeling has typically been plagued by uncertainties. Neural network methods have been developed for reservoir prediction using seismic attributes. Such methods have been based, for example, on back propagation or BP neural networks and self-organizing map or SOM neural networks to predict reservoir hydrocarbons. However, attempts to predict reservoir properties based on a neural network modeling methodology have resulted in networks which have been what is known as easily "over-trained," which in turn has resulted in "over-fitting," and thus provided poor predictions in validation trials.

Seismic attributes are quantitative measure of the characteristics of a seismic trace over specific intervals or formation layers in the earth. Seismic attributes can provide as much information as possible for integration of the subsurface structure and prediction of the presence and location of hydrocarbons. Seismic attributes have commonly been used for hydrocarbon prospect identification and risking, hydrocarbon play evaluation, reservoir characterization, and the like. An advantage of the seismic attributes is that they can predict at and away from wells, while still honoring well data. Often, predictions are more detailed than simply interpolating well data. There have been a number of distinct seismic attributes which have been calculated both from seismic data and their transforms. However, the use of these attributes to integrate the subsurface structure and predict the reservoir is a problem which has, so far as is known, not been adequately addressed.

SUMMARY OF THE INVENTION

Briefly, the present invention provides a new and improved computer implemented method of modeling a reservoir property of subsurface reservoir structure by support vector machine processing in the computer of input data available from the reservoir to form measures of the reservoir property at regions of interest in the subsurface reservoir by regression analysis of the available input data, the method comprising the computer processing steps of: (a) receiving training input data about subsurface attributes from seismic survey data obtained from seismic surveys of the reservoir; (b) receiving training target data about formation rock characteristics from data obtained from wells in the reservoir; selecting formation attribute parameters for support vector machine modeling by cross-correlation of the training input data with the training target data; optimizing the selected formation attribute parameters; providing the training input data and the optimized selected formation attribute parameters as inputs for support vector machine modeling; performing support vector machine modeling to predict the reservoir property based on the optimized selected formation attribute parameters; and forming an output display of the predicted reservoir property.

The present invention also provides a new and improved data processing system for modeling a reservoir property of subsurface reservoir structure by support vector machine processing in the computer of input data available from the reservoir to form measures of the reservoir property at regions of interest in the subsurface reservoir by regression analysis of the available input data, the data processing system comprising: a processor for performing the steps of: receiving training input data about subsurface attributes from seismic survey data obtained from seismic surveys of the reservoir; receiving training target data about formation rock characteristics from data obtained from wells in the reservoir; selecting formation attribute parameters for support vector machine modeling by cross-correlation of the training input data with the training target data; optimizing the selected formation attribute parameters; providing the training input data and the optimized selected formation attribute parameters as inputs for support vector machine modeling; performing support vector machine modeling to predict the reservoir property based on the optimized selected formation attribute parameters; and display for performing the step of: forming an output display of the predicted reservoir property.

The present invention further provides a new and improved data storage device having stored in a computer readable medium computer operable instructions for causing a data processing system to modeling a reservoir property of subsurface reservoir structure by support vector machine processing in the computer of input data available from the reservoir to form measures of the reservoir property at regions of interest in the subsurface reservoir by regression analysis of the available input data, the instructions stored in the data storage device causing the data processing system to perform the following steps: receiving training input data about subsurface attributes from seismic survey data obtained from seismic surveys of the reservoir; receiving training target data about formation rock characteristics from data obtained from wells in the reservoir; selecting formation attribute parameters for support vector machine modeling by cross-correlation of the training input data with the training target data; optimizing the selected formation attribute parameters; providing the training input data and the optimized selected formation attribute parameters as inputs for support vector machine modeling; performing support vector machine modeling to predict the reservoir property based on the optimized selected formation attribute parameters; and forming an output display of the predicted reservoir property.

DETAILED DESCRIPTION OF THE PREFERRED EMBODIMENTS

Support Vector Machine Modeling

Figure 1:
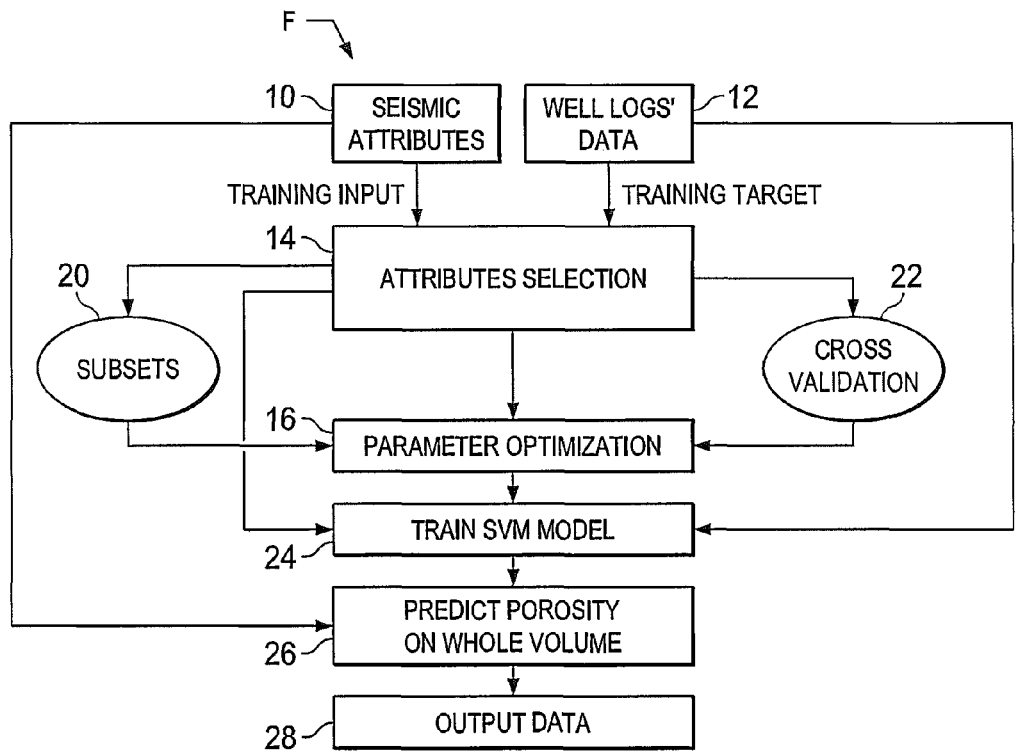
FIG. 1 is a functional block diagram of a set of data processing steps performed in a data processing system for reservoir properties prediction of subsurface earth formations according to the present invention.

With the present invention, it has been determined that a computerized modeling methodology known as support vector machines (SVM) can be used for reservoir attribute or property prediction, provided certain processing methodologies according to the present invention are also performed. Support vector machines are based on statistical learning theory originated by V. Vapnik as described in a text book "Statistics Learning Theory" (1998). Support vector machines are a known technique among machine learning models. With the present invention, a form of SVM regression is performed. The SVM regression with the present invention also incorporates processing with a selected form of a proper form of various kernels for processing; removal of redundant attributes or those that might have little contribution to the target; attribute normalization to provide that each attribute has equal contribution; and automatic determination of the kernel parameter and penalty parameter.

Support vector machines are formed in computers by creating a sparse decision function expansion and selecting only a selected number of training points, known as support vectors. Through the use of kernels, linear function approximation algorithms involving explicit inner products between data points in an input space can be conveniently and efficiently transformed into their nonlinear generalizations. SVM's approximately implement Vapnik's structural risk minimization principle through a balanced tradeoff between empirical error (risk) and model complexity (measured through prediction of probable model test error bounds with what is known as the VC dimension).

First, maximum margin classifiers are established by denoting a two-class classification linear problem as follows:

$$y(x)=W^T\phi(x)+b \quad (1)$$

where $\phi(x)$ denotes a fixed feature-space transformation, and the bias parameter b has been made explicit. W denotes kernel function; here Gaussian Radius Basic Function kernel will be used.

The training data set comprises N input vectors $x_1, \ldots x_n$, with corresponding target values $t_1, \ldots t_n$, where $$t_n \in \{-1,1\},$$

and new data points x are classified according to the sign of y(x).

For linearly separable feature space, there exists at least one choice of the parameters W and b which satisfies $$y(x_n)>0$$

for points having $t_n=+1$, and $y(x_n)<0$ for points having $t_n=-1$, so that $y(x_n)t_n>0$ for all training data points. Finding such a best choice of W and b is used to represent the vector machine to predict y(x) new data points x.

Regression Modeling

With the present invention, support vector machine methodology is extended to regression problems while at the same time preserving the property of sparseness. Considering the problem of SVM regression modeling of the same form as Equation (1), the training data set again comprises N input vectors $x_1, \ldots x_n$, with corresponding target values $t_1, \ldots t_n$, where $t_n$ could be any target numerical series. The support vector machine seeks to model the relationship between the inputs and the output by minimizing a regularized error function given by $$\frac{1}{2}\sum_{n=1}^{N}\{y_n - t_n\}^2 + \frac{\lambda}{2}\|w\|^2 \quad (2)$$

To obtain sparse solutions, the above quadratic error function is replaced by an $\epsilon$-insensitive error function E as follows $$E_\epsilon(y(x)-t) = \begin{cases} 0, & \text{if } |y(x)-t| < \epsilon; \\ |y(x)-t|-\epsilon, & \text{otherwise} \end{cases} \quad (3)$$

A regularized error function can then be minimized, such as an error function given by $$C\sum_{n=1}^{N}(E_\epsilon(y(x_n)-t_n))+\frac{1}{2}\|w\|^2 \quad (4)$$

where y(x) is given by Equation (1), and C represents the inverse regularization parameter, also known as a penalty parameter.

The optimization problem discussed above can then be restated by introducing slack variables. For each data point $x_n$, two slack variables are introduced $$\begin{cases} \xi_n \geq 0, & \text{if } y(x_n)-t_n < \epsilon \\ \hat{\xi}_n \geq 0, & \text{if } y(x_n)-t_n > \epsilon \end{cases}$$

The solution to regression is now to find best parameters to ensure most target points to lie inside the ε-tube so that $y(x_n)-\epsilon \leq t_n \leq y(x_n)+\epsilon$, while introducing slack variables allows some of the points to lie outside the tube for the flexibility of fitting provided the slack variables are nonzero.

The error function for support vector regression can then be finally written as $$C\sum_{n=1}^{N}\left(E_\epsilon(\xi_n+\hat{\xi}_n)\right)+\frac{1}{2}\|w\|^2 \quad (5)$$

So that $t_n \leq y(x_n)+\epsilon+\xi_n$ and $t_n \geq y(x_n)-\epsilon-(\hat{\xi}_n)$. With the use of what are known as Lagrange multipliers and Karush-Kuhn-Tucker (KKT) conditions, Equation (5) can be used for a training data point to compute the bias term b. For a non-sparseness least square approach, Equation (5) can be expressed as:

$$C\sum_{n=1}^{N}\left((\xi_n^2+\hat{\xi}_n^2)\right)+\frac{1}{2}\|w\|^2 \quad (6)$$

A least square approach with radial based function (RBF) kernels is thus incorporated to minimize the error function of Equation (6) for both linear and non-linear regression. Least square SVM modeling according to the present invention provides global and unique solutions though it lacks sparseness and interpretation of support vectors.

Before supervised training, automatic attributes selection is applied by cross correlation instead of linear coefficient weighting theory. Two passes of cross validation and grid search techniques are developed to achieve the best RBF parameters to avoid over fitting. The least square approach is applied to minimize the regression error. The prediction of reservoir properties according to the present invention is robust and reliable.

Computer Processing for Reservoir Properties Prediction

In the drawings, a flowchart F shown in FIG. 1 indicates the basic computer processing sequence of the present invention for forming models of predicted reservoir properties of a subsurface reservoir of interest with least squares regression support vector machine modeling porosity according to the present invention. The processing sequence of the flow chart F is based on data obtained from wells in the reservoir and from seismic attribute data obtained from processing of seismic surveys in the area overlying the reservoir. The processing of data according to FIG. 1 to obtain models of predicted reservoir properties is performed in a data processing system D (FIG. 2) as will also be described.

Turning to FIG. 1, processing in data processing system D begins during step 10 (FIG. 1) by transfer from data memory of input parameters or data for processing according to the present invention. As indicated in step 10, input parameters or data in the form of seismic attributes obtained from conventional processing of seismic survey data of regions overlying the reservoir of interest are provided as training input data. Examples of seismic attribute data which are provided as training inputs, for example, are amplitude, frequency, first envelope data, second envelope data, phase, coherence, bandwidth and acoustic impedance. It should be understood that other types of seismic attribute data may also be used.

As indicated at step 12, input data in the form of training target data for support vector machine modeling is transferred from data memory. The training target data provided during step 12 are petrophysical measures or parameters and values of attributes, such as porosity, acoustic impedance and the like. The training target data are obtained from conventional processing of data obtained from well logs of those wells which are actually present in the reservoir. In some cases, where available, training target data obtained from processing of core sample data may also be used.

During step 14 of processing in the data processing system D, the stored input data is subjected to attribute selection according to the present invention. The attribute selection during step 14 provides a selection among the available seismic attributes of the training input data from step 10 before further processing. Attribute selection is performed to obtain related attributes so as to minimize computation workload and to increase processing efficiency. Attribute selection during step 14 also decrease the risk of adverse effects of unsuitable data.

With the form of SVM modeling according to the present invention, a cross-correlation approach for attributes selection is provided during step 14. The cross-correlation approach is cost effective and has been found to select those related attributes for reservoir predictions. During step 14, the data processing determines a correlation coefficient between each available attribute in the training input data and each of the training target inputs available wells in the reservoir. A user specified threshold is then used to eliminate the attributes that have lower absolute correlation coefficients than the specified threshold.

Processing next proceeds to step 16 for parameter optimization. During parameter optimization step 16, those selected attributes from step which meet threshold requirements are subjected to data or amplitude scaling. Data scaling is performed to prevent attributes which have greater numeric ranges dominating those in smaller numeric ranges. Another advantage of data scaling is to avoid numerical difficulties during the processing calculations. Because kernel values usually depend on the inner products of feature vectors, e.g. the linear kernel and the polynomial kernel, large attribute values might cause numerical problems. With the present invention linear scaling of both the training and testing data set for each attribute is performed to furnish in the same scale and to a value in a defined range, either [−1, 1] or [0,1].

During SVM modeling step 24, the data processing system D operates according to a support vector machine methodology and forms models of relationships between the input and target data. The modeling is done by regression, as discussed above, minimizing an error function. The data processing system D during the regression processing uses radial based function (RBF) kernel having a kernel parameter $\gamma$ and a penalty parameter C.

During the support vector machine modeling step 24, certain production requirements need to be met in order to perform such SVM regression. These include selection of a proper processing kernel out of various kernels; removal of attributes that might be redundant and have little contribution to the target; and confirmation that each attribute selected for use during step 24 has equal contribution; and automatic determination of kernel parameter $\gamma$ and the penalty parameter C.

The following is an example listing of a sequence for computerized reservoir property prediction according to the present invention.

```
usage: software name: ressvm
ressvm segyfiles wellfiles welldescriptions parameters
        segyfiles: list of segy file names with each segy contains one
        seismic
                attribute
segy1.sgy
segy2.sgy
segy3.sgy
    ...
Wellfiles: for example: Wells that contains reservoir properties, porosity or
        others
well1.txt
well2.txt
well3.txt
    ...
Each well file contains: the value of the property (porosity).
0.301
0.299
0.295
    ...
    Well description files (for 3 wells)
Inline:     557
CDP:        386
Number_of_samples: 74
initial_time: 808.0
DT: 4       //---------well1-------------
Inline:     439
CDP:        336
Number_of_samples: 74
initial_time: 800.0
DT: 4       //---------------well2---------------
Inline:     360
CDP:        1006
Number_of_samples: 74
initial_time: 568.0
DT: 4  //----------------well3---------------
        Parameters: a file that contains the following content:
The default is: parameter.txt
nsubset: 0 #if 0, the size will be the number of wells
        attribute_correlation_threshhold: 0.2 #if ==0, all attributes
will be used. It is within (0, 1)
max_itr: 100     normally, keep it as is
show: 0          normally, keep it as is
        eps: 1.0e-15         normally, keep it as is
        fi_bound: 1.0e-15    normally, keep it as is
        kernel_type: RBF_kernel normally, keep it as is
        gamma1: -5.0
        dgamma: 1.0
        gamma2: 15.0
c1: -5.0
dc: 1.0
c2: 30.0
traces_buffer: 5000
Segy_Inline: ffid
Segy_cdp: cdp
```

-continued

```
output_file: ressvm.sgy
log_file: ressvm.log
//---------------------------------------------------------------------------
    The predicted result file will be: ressvm.sgy
    The log file will be: ressvm.log
```

A radial basis function (RBF) parameter according to Equation (7) has been found to be preferred for SVM modeling step 24 according to the present invention:

$$K(x_i, x_j) = e^{-\gamma \|x_i - x_j\|^2}, \gamma > 0 \quad (7)$$

One reason that the radial basis function (RBF) kernel is used is that it nonlinearly maps samples into a higher dimensional space so it, unlike a linear kernel, can handle the case when the relation between class labels and attributes is nonlinear. Furthermore, an RBF kernel can achieve the results as simpler linear or sigmoid kernels, which are not adapted for nonlinear relationships. Another reason is the number of hyper-parameters which influences the complexity of model selection. A polynomial kernel has more hyper-parameters than the RBF kernel. Finally, the RBF kernel has fewer numerical difficulties.

The two parameters, the kernel parameter $\gamma$ and the penalty parameter C play key roles on SVM prediction accuracy. Practically, a user does not know in advance what the best parameter pair (C, $\gamma$) is for a particular data set. To reduce uncertainty and user trial burden, before SVM step 24 a parameter grid search step 20 and cross-validation step 22 are performed to achieve an optimal pair of (C, $\gamma$), in the meantime preventing the SVM from being over-trained and over-fitting.

The cross-validation during step 22 is n-fold, in that the training set is divided or partitioned into n subsets during step 20. The n subsets need not necessarily be the same size; the n-fold could be n well logs. Sequentially one subset is tested for a given parameter pair of (C, $\gamma$) trained on the remaining n−1 subsets until each instance of the whole training set is predicted once. Then a minimum mean square error E is calculated and recorded for this test parameter pair of (C, $\gamma$).

During step 24 a grid search framework is provided to loop over the parameter pairs of (C, $\gamma$). The best fitting parameter pair (C, $\gamma$) that has the minimum error E are then used as production testing prediction during step 26.

To save computational time and yet achieve rather accurate (C, $\gamma$) parameter pair, it has been found that trying exponentially growing sequences of C is a practical method to identify good parameters (for example, $C = e^{-15}, e^{-14} \ldots e^{14}, e^{15}$ and $\gamma = e^{-5}, e^{-4} \ldots e^{4}, e^{5}$).

It is also recommended that two rounds of searching be performed during step 24. The first is a coarse search with exponential factor of $e^1$, and a second finer search is performed around the first round (C, $\gamma$) with searching interval of $e^{0.1}$. It should be understood that it is contemplated that both the coarse and finer search intervals may be adjusted to meet particular computing needs. This technique has been found to provide an optimal (C, $\gamma$) parameter pair. The optimal parameter pair determined during step 24 is then applied to the whole training dataset during step 26 to predict a reservoir property of interest for whole testing data set. The predicted reservoir property is then during step 28 provided as output to memory of the data processing D and available for forming output displays.

Data Processing System

Figure 2:
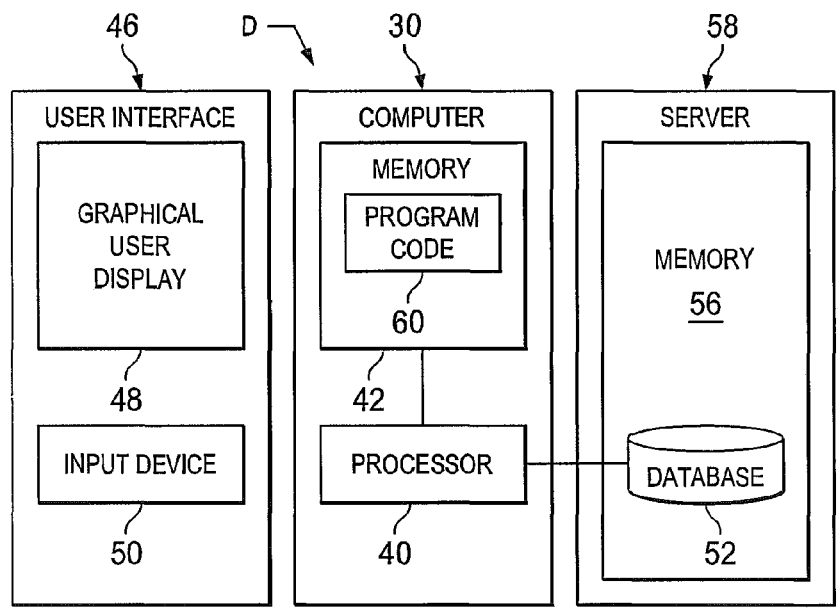
FIG. 2 is a schematic block diagram of a data processing system for reservoir properties prediction of subsurface earth formations according to the present invention.

As illustrated in FIG. 2, a data processing system D according to the present invention includes a computer 30 having a processor 40 and memory 42 coupled to processor 40 to store operating instructions, control information and database records therein. The computer 30 may, if desired, be a portable digital processor, such as a personal computer in the form of a laptop computer, notebook computer or other suitable programmed or programmable digital data processing apparatus, such as a desktop computer. It should also be understood that the computer 30 may be a multicore processor with nodes such as those from Intel Corporation or Advanced Micro Devices (AMD), an HPC Linux cluster computer or a mainframe computer of any conventional type of suitable processing capacity such as those available from International Business Machines (IBM) of Armonk, N.Y. or other source.

The computer 30 has a user interface 46 and an output data display 48 for displaying output data or records of lithological facies and reservoir attributes according to the present invention. The output display 48 includes components such as a printer and an output display screen capable of providing printed output information or visible displays in the form of graphs, data sheets, graphical images, data plots and the like as output records or images.

The user interface 46 of computer 30 also includes a suitable user input device or input/output control unit 50 to provide a user access to control or access information and database records and operate the computer 30. Data processing system D further includes a database 52 stored in computer memory, which may be internal memory 42, or an external, networked, or non-networked memory as indicated at 56 in an associated database server 58.

The data processing system D includes program code 60 stored in memory 54 of the computer 30. The program code 60, according to the present invention is in the form of computer operable instructions causing the data processor 40 to perform the computer implemented method of the present invention in the manner described above and illustrated in FIG. 1.

It should be noted that program code 60 may be in the form of microcode, programs, routines, or symbolic computer operable languages that provide a specific set of ordered operations that control the functioning of the data processing system D and direct its operation. The instructions of program code 60 may be may be stored in memory 54 of the computer 30, or on computer diskette, magnetic tape, conventional hard disk drive, electronic read-only memory, optical storage device, or other appropriate data storage device having a computer usable medium stored thereon. Program code 60 may also be contained on a data storage device such as server 58 as a computer readable medium, as shown.

The method of the present invention performed in the computer 30 can be implemented utilizing the computer program steps of FIG. 1 stored in memory 54 and executable by system processor 40 of computer 30. The input data to processing system D are the well log data and other data regarding the reservoir described above.

Results of Processing Test Data

Figure 3:
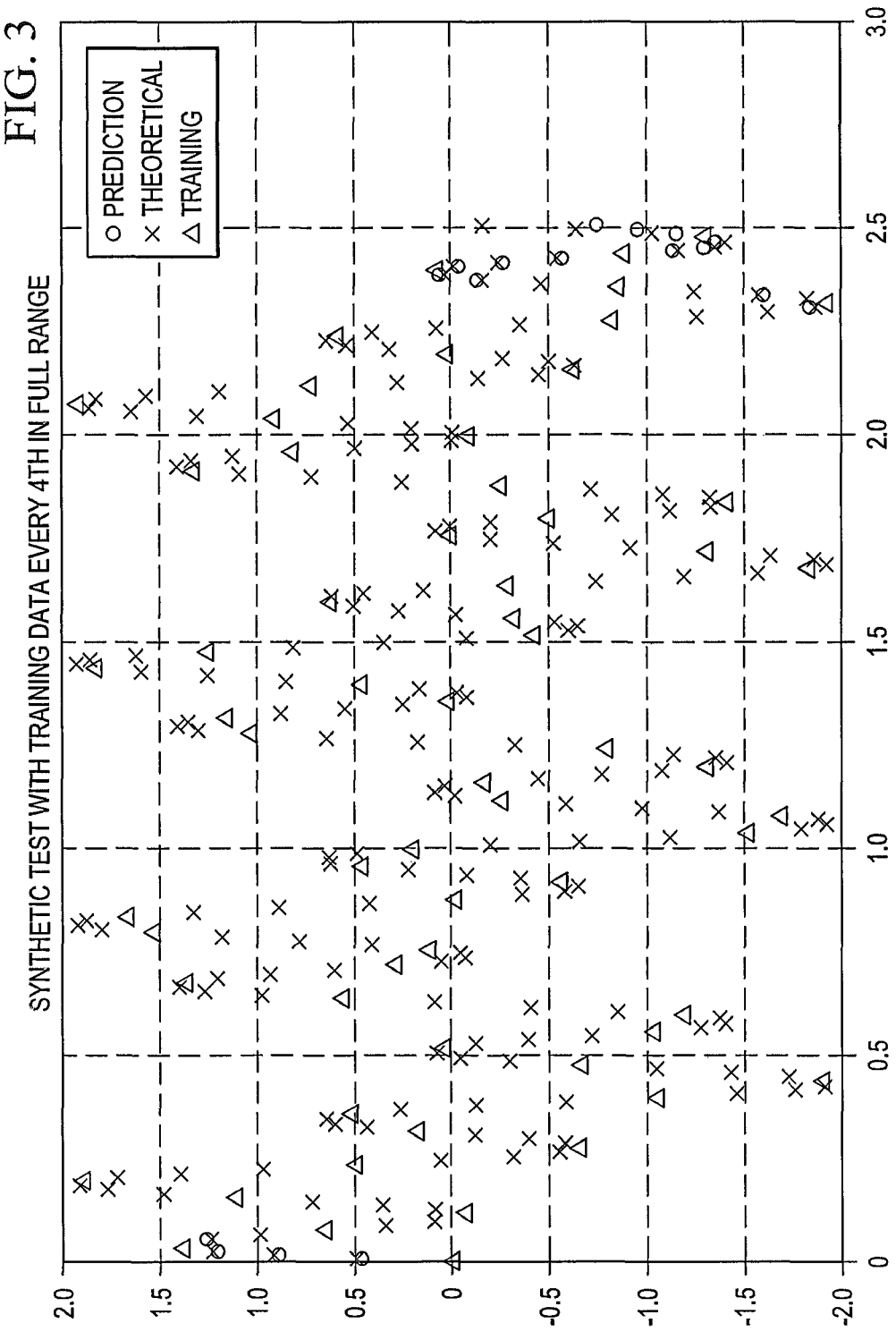
FIG. 3 is a plot of test results obtained from synthetic data during reservoir properties prediction of subsurface earth formations according to the present invention.

Given a theoretical function $$y=\sin x+\sin 4x, x \in (0.4\pi), dx=0.1 \quad (8)$$

with X sampled in the interval of 0.1, the corresponding y series is plotted in FIG. 3 for theoretical values as identified by the legend for FIG. 3.

In a test model using synthetic data according to the mathematically defined, but non-linear, function expressed in Equation (8), the SVM was trained using every fourth x point in the function. The SVM then attempted to predict the remaining x points. Then a comparison was made between the predicted points and the theoretical points to determine how accurate the matches were.

FIG. 3 is a plot of a first such SVM synthetic test with training data every fourth x point from 0 to $4\pi$. In FIG. 3, theoretical data points are indicated the legend as described above, training subsets are indicated as identified in the legend and predicted SVM regression points are also indicated as identified in the legend.

As is evident the SVM regression points in a considerable number of places are not visible due to substantially exact overlap with the theoretical data points. It is noted that since a majority of SVM regression points substantially overlap on the theoretical data points, the effectiveness of SVM prediction can be inferred.

Figure 4:
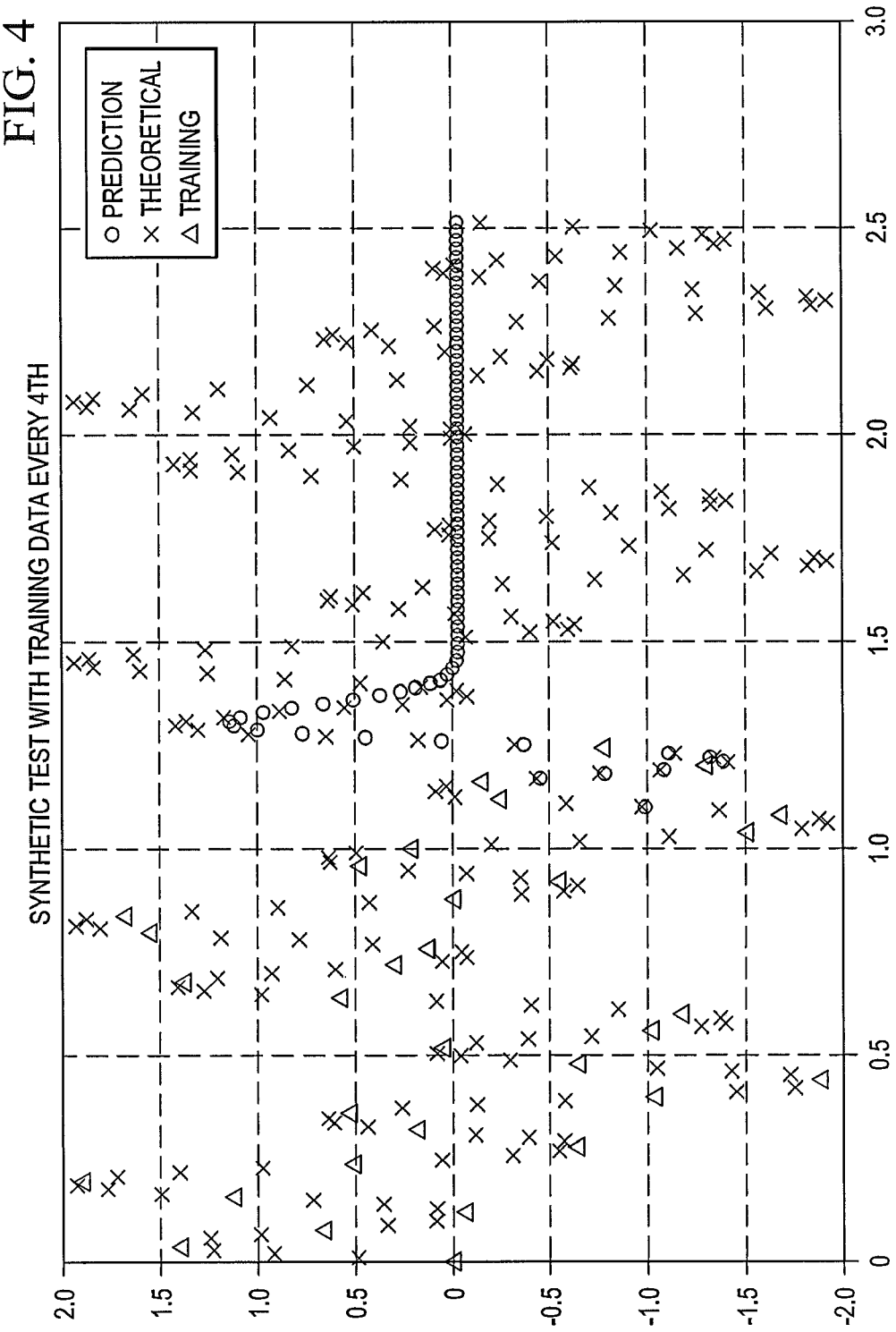
FIG. 4 is a plot of test results obtained from synthetic data during reservoir properties prediction of subsurface earth formations according to the present invention.

A second test was run on the same data set in the same way as the first. However, the training data points in were reduced by half in range, from 0 to $2\pi$, to check the robustness of the SVM regression. FIG. 4 is a plot of the second SVM synthetic test with training data every fourth x point from 0 to $2\pi$. In FIG. 4, theoretical data points are indicated as identified in the legend for FIG. 4 and training subsets and predicted SVM regression points are also indicated as identified. Again, predicted SVM regression points in a considerable number of instances are not visible due to substantially exact overlap with the theoretical data points.

It is observed that prediction within the testing range fitted the theoretical data adequately well. However, for the points outside of training range, the prediction was not adequately close. This is not unexpected, since the formula of Equation (8) is not a linear relationship. Such a non-linear relationship would be expected to require more complete training data sets. In addition, there was only one feature input in both tests, namely x. In reservoir properties prediction, a multiple attributes (features) space is present for SVM modeling. The results of the first and second synthetic data tests provided substantiation and a sufficient basis to run practical reservoir property prediction test with multiple seismic attributes.

Results of Processing Actual Reservoir Data

A 3D volume of eight seismic attributes in a known oil fields was provided as training data inputs. There were three drilled wells which were used as the sources of training well target inputs. Each well recorded the reservoir porosity property at different depths. A suitably adequate number of seismic attributes were selected out of nine attributes, the SVM model was then trained according to the present invention, and then a predicted reservoir property (porosity) determined according to the present invention over the full volume of the reservoir, even where wells are not present.

The attributes were: amplitude, frequency, first envelope and second envelope, phase, coherence, bandwidth and acoustic impedance. Attributes were first selected at three well locations. The cross-correlation coefficients were calculated between attributes and the porosity. Specifically, namely the cross-correlation coefficients were 0.051, 0.0067, 0.0994, 0.0124, 0.0442, 0.1819, 0.082, and 0.709. A rejection threshold of 0.05 was selected, which resulted in five attributes which met the cross-correlation threshold for training and testing. The five attributes were: amplitude, frequency, coherence, bandwidth and acoustic impedance.

For cross-validation, each well was treated as a subset. After two rounds of searching and validation, the final γ was: 42.2, the final C was: 4194304. The minimum cross-validation fitting error with the chosen γ and C was 0.000472, compared to the porosity range from 0.25~0.35. To check the validation of the prediction, the predicted porosity was compared at three well locations and illustrated in FIG. 5, FIG. 6 and FIG. 7.

Figure 5:
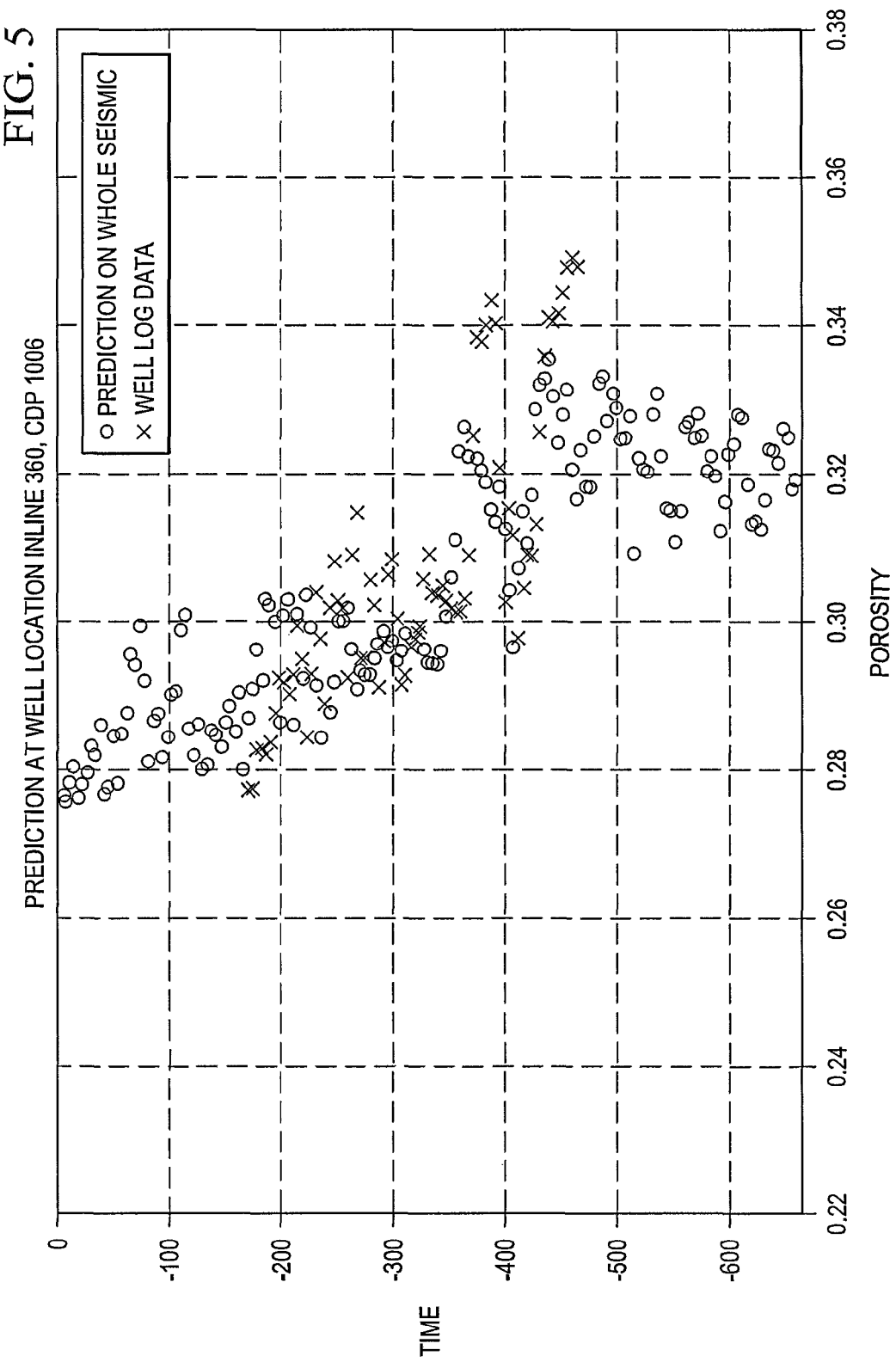
FIG. 5 is a plot of a porosity prediction for a well obtained during reservoir properties prediction of subsurface earth formations according to the present invention.

FIG. 5 is a plot of predicted porosity prediction for a well at known reservoir location in the reservoir. The data points for measured porosity obtained from well data, in the plot of FIG. 5 are identified as indicated by the legend, and the and the data points representing porosities predicted from SVM modeling according to the present invention are also indicated according to the legend for that Figure.

Figure 6:
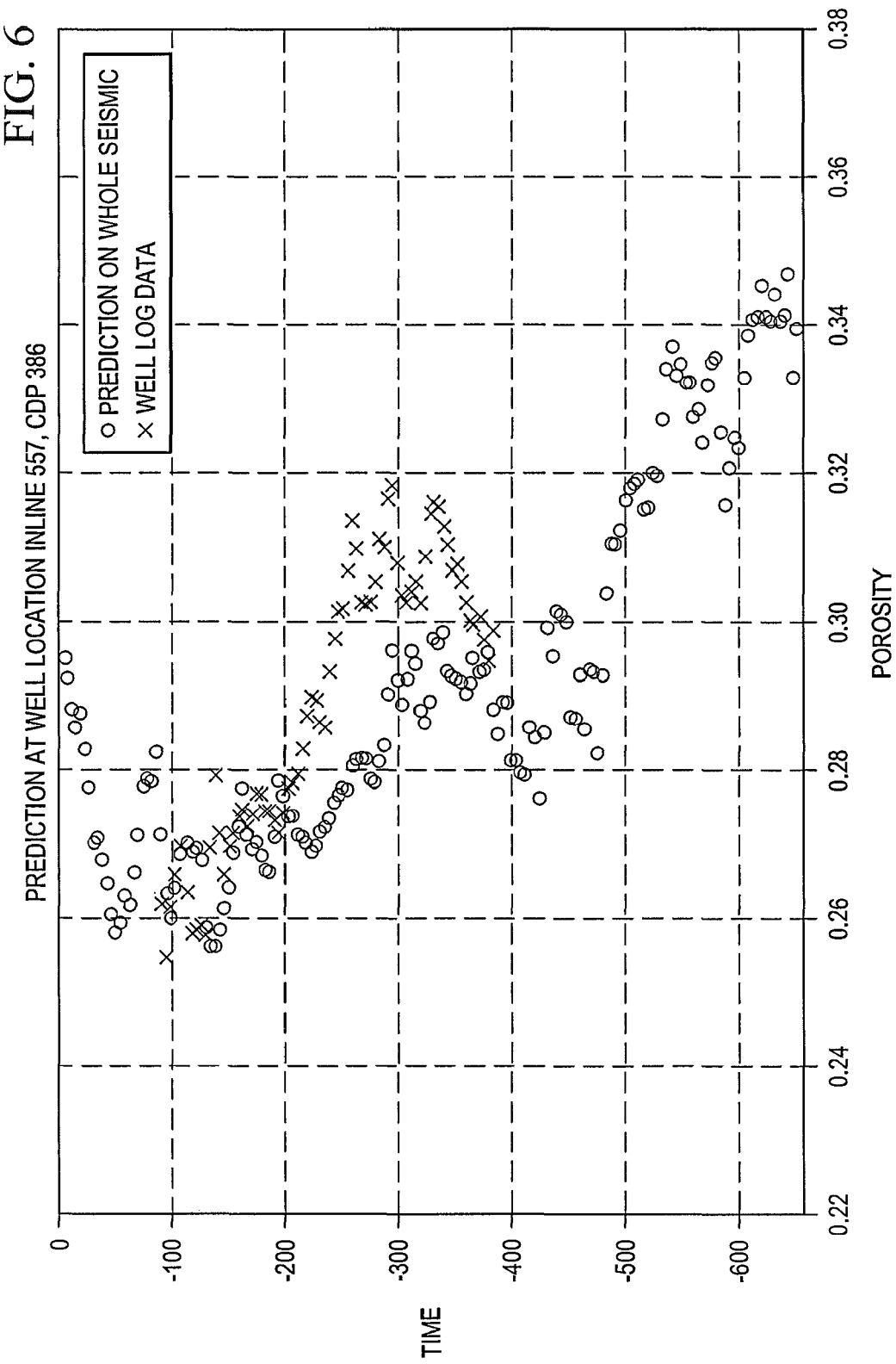
FIG. 6 is a plot of a porosity prediction for another well obtained during reservoir properties prediction of subsurface earth formations according to the present invention.

FIG. 6 is a plot of predicted porosity prediction for a different well from that of FIG. 5, but in the same reservoir. Again, the data points for measured porosities from well data in FIG. 6 are indicated as identified by the legend represent data points representing porosities predicted from SVM modeling according to the present invention are indicated according to the legend.

Figure 7:
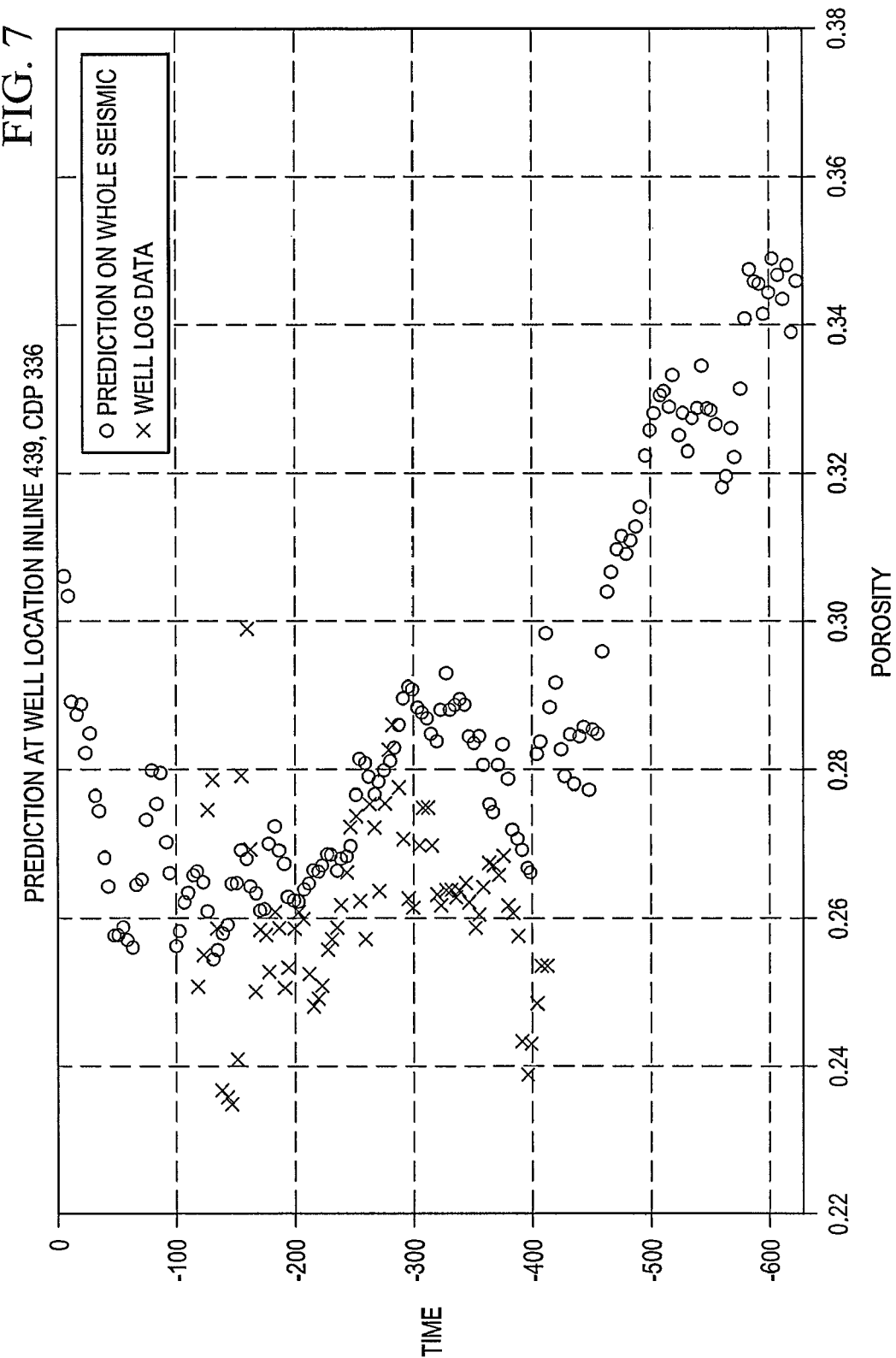
FIG. 7 is a plot of a porosity prediction for another well obtained during reservoir properties prediction of subsurface earth formations according to the present invention.

FIG. 7 is a plot of predicted porosity prediction for a different well from that of FIGS. 5 and 6, but in the same reservoir. Again, the data points for measured porosities obtained from well data are indicated according to the legend, and data points for porosities predicted from SVM modeling according to the present invention are also indicated according to the legend.

It is to be noted that predicted porosity points in FIGS. 5, 6 and 7 fit naturally with the measured porosity, though they do not exactly match the real porosity. It is expected with the present invention to achieve prediction results comparable in such a natural fit to these examples, but without exact matching. In this manner, over-fitting can be avoided, without consequent failure to predict the reservoir property values at locations where wells are not present.

Figure 8:
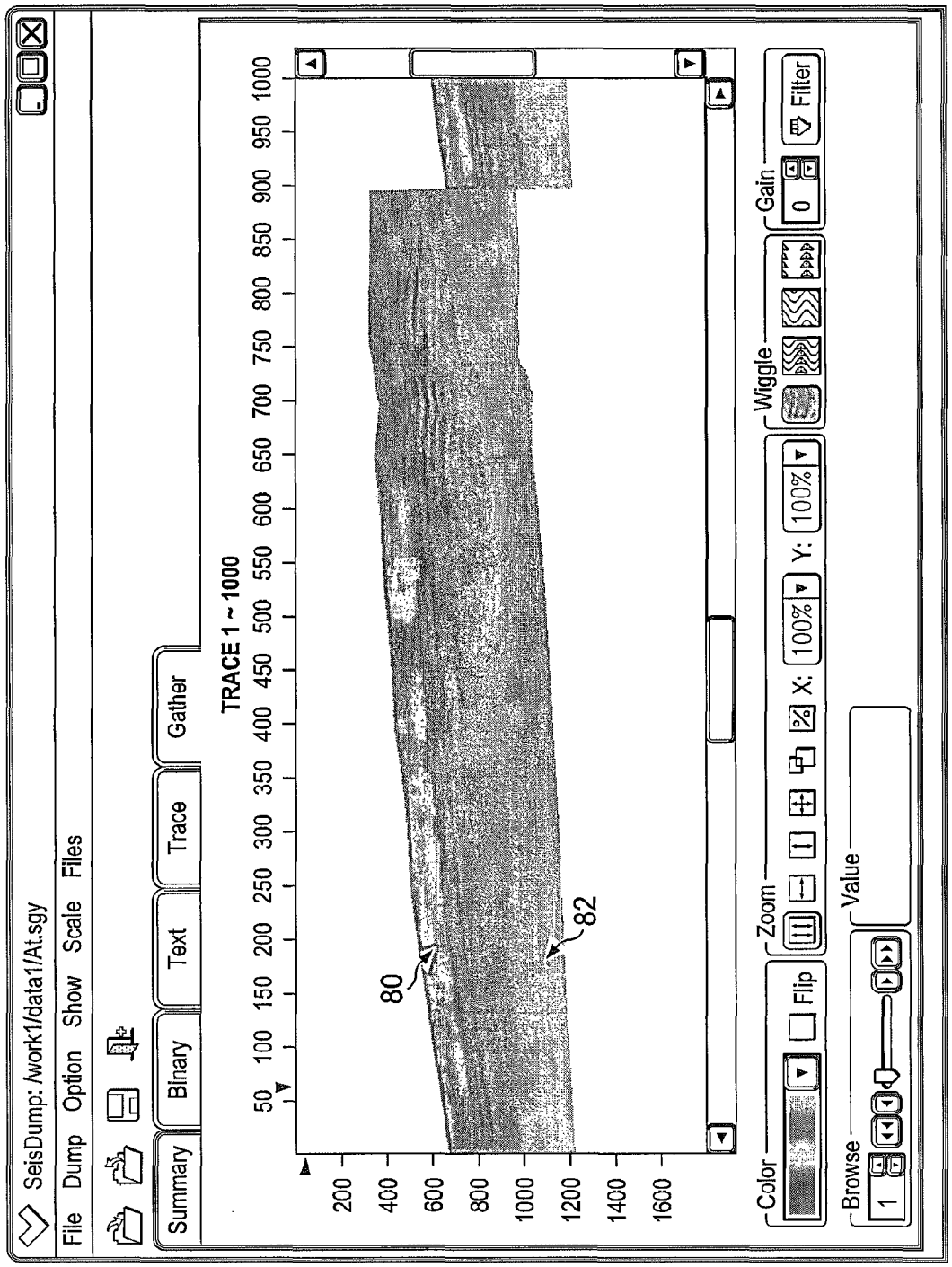
FIG. 8 is a plot of acoustic impedance superimposed on a vertical cross section of subsurface earth formations obtained during reservoir properties prediction of subsurface earth formations according to the present invention.

FIG. 8 is a display of values of seismic attribute input data of acoustic impedance obtained during seismic surveying and used as one of the five attributes during the processing described above to obtain the results illustrated in FIGS. 5, 6 and 7. The acoustic impedance data of FIG. 8 are plotted along a seismic line of profile across an actual reservoir. The acoustic impedance data is also plotted as a function of time/depth over about one thousand traces of the seismic line, with the attribute values in actual displays being indicated in color as indicated by color variations. A top portion 80 of FIG. 8 represents an area of lower acoustic impedance, extending downwardly to a lower portion 82 of higher acoustic impedance.

Figure 9:
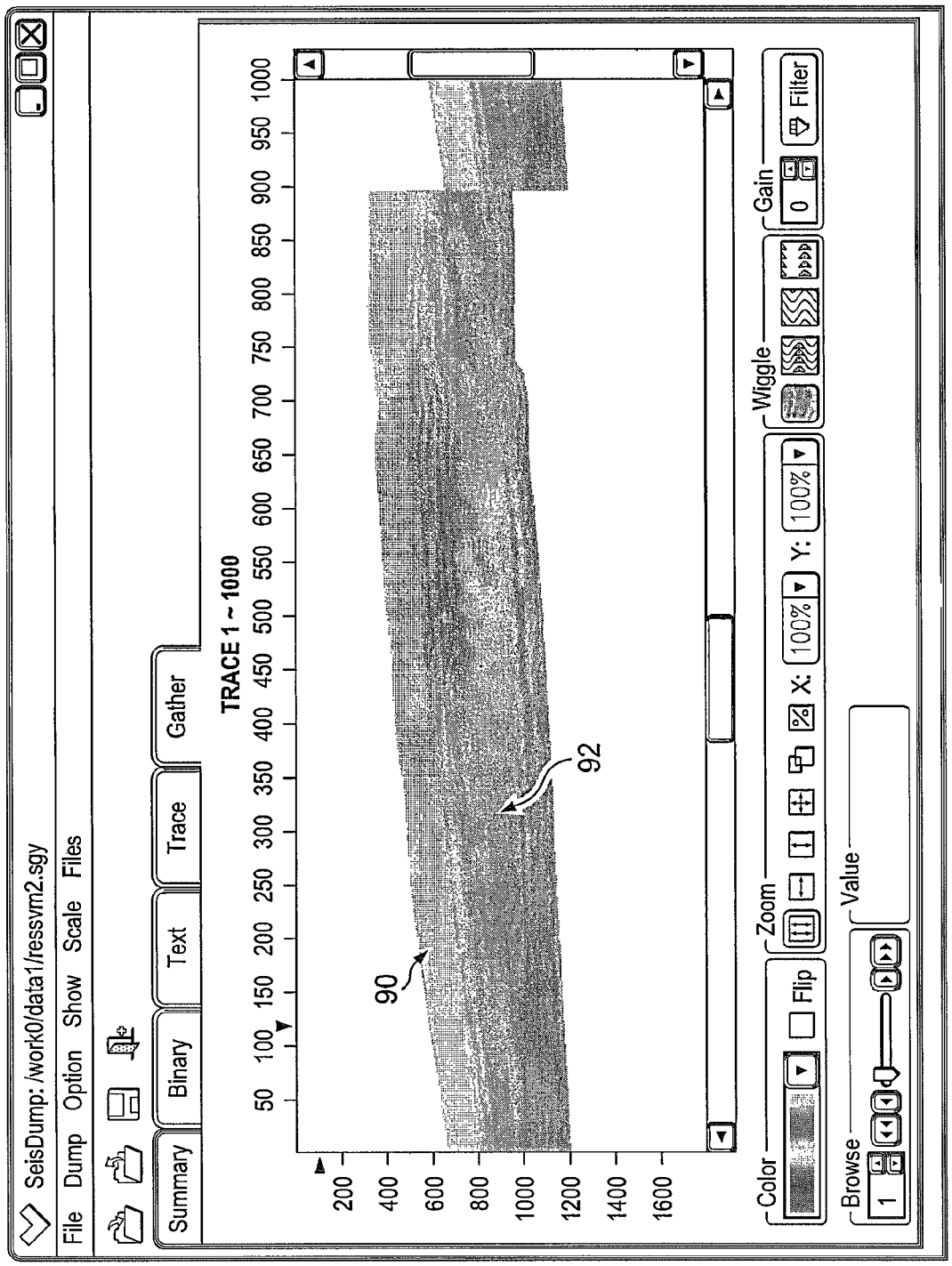
FIG. 9 is a plot of porosity obtained during reservoir properties prediction of subsurface earth formations according to the present invention and superimposed on the same vertical cross section of subsurface earth formations as FIG. 8.

FIG. 9 is a display of predicted values of porosity as a reservoir property obtained as a result of SVM modeling according to the present invention along the same line of profile as in FIG. 8 across the reservoir and using the acoustic impedance attribute data of FIG. 8 along with the other four attributes used to obtain the results shown in FIGS. 5, 6 and 7. The predicted porosity in FIG. 9 is also plotted as a function of time/depth over the same traces as FIG. 8, with the predicted porosity values in actual practice being indicated in color as indicated by color variations. An upper portion 90 of FIG. 9 represents an area of high porosity, while a lower portion 92 in FIG. 9 indicates an area of lower porosity.

During the correlation processing in SVM modeling according to the present invention, it was noted that the acoustic impedance had a very strong negative correlation with porosity, which means lower acoustic impedance corresponds to higher porosity and vice versa. It is to be noted that the predicted porosity in FIG. 9 exhibits a similar negative correlation relationship to the acoustic impedance of FIG. 8 as would be expected. The final full predicted reservoir property data for the reservoir, such as porosity shown in FIG. 9 for a portion of the reservoir, obtained according to the present invention are stored in data memory and plots like those of FIG. 9 are available to reservoir analysts for further studying and evaluation of the reservoir characteristics.

Figure 10:
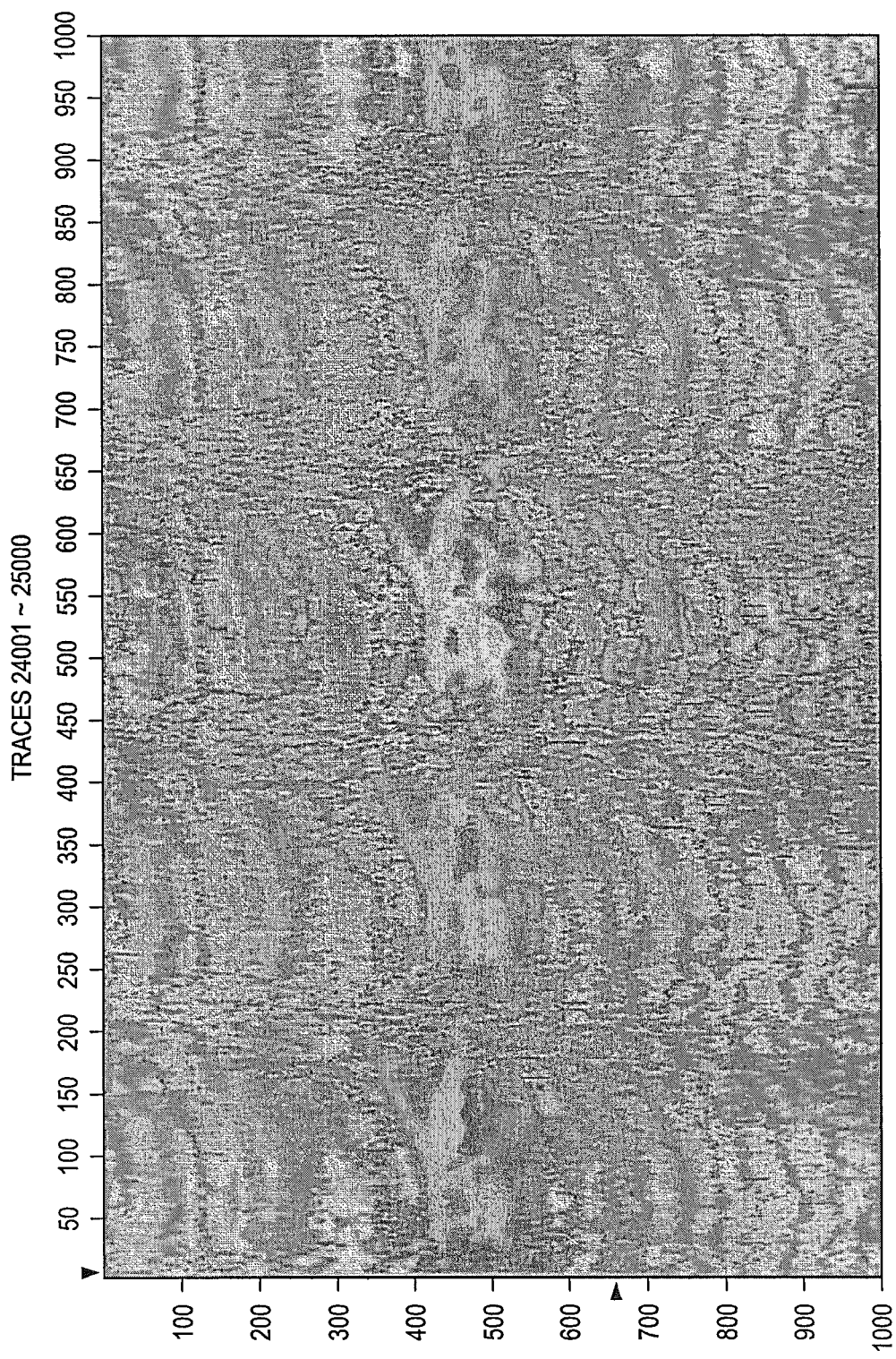
FIG. 10 is a plot of input frequency attribute seismic data for reservoir properties prediction of subsurface earth formations according to the present invention and superimposed on a vertical cross section of subsurface earth formations.
Figure 11:
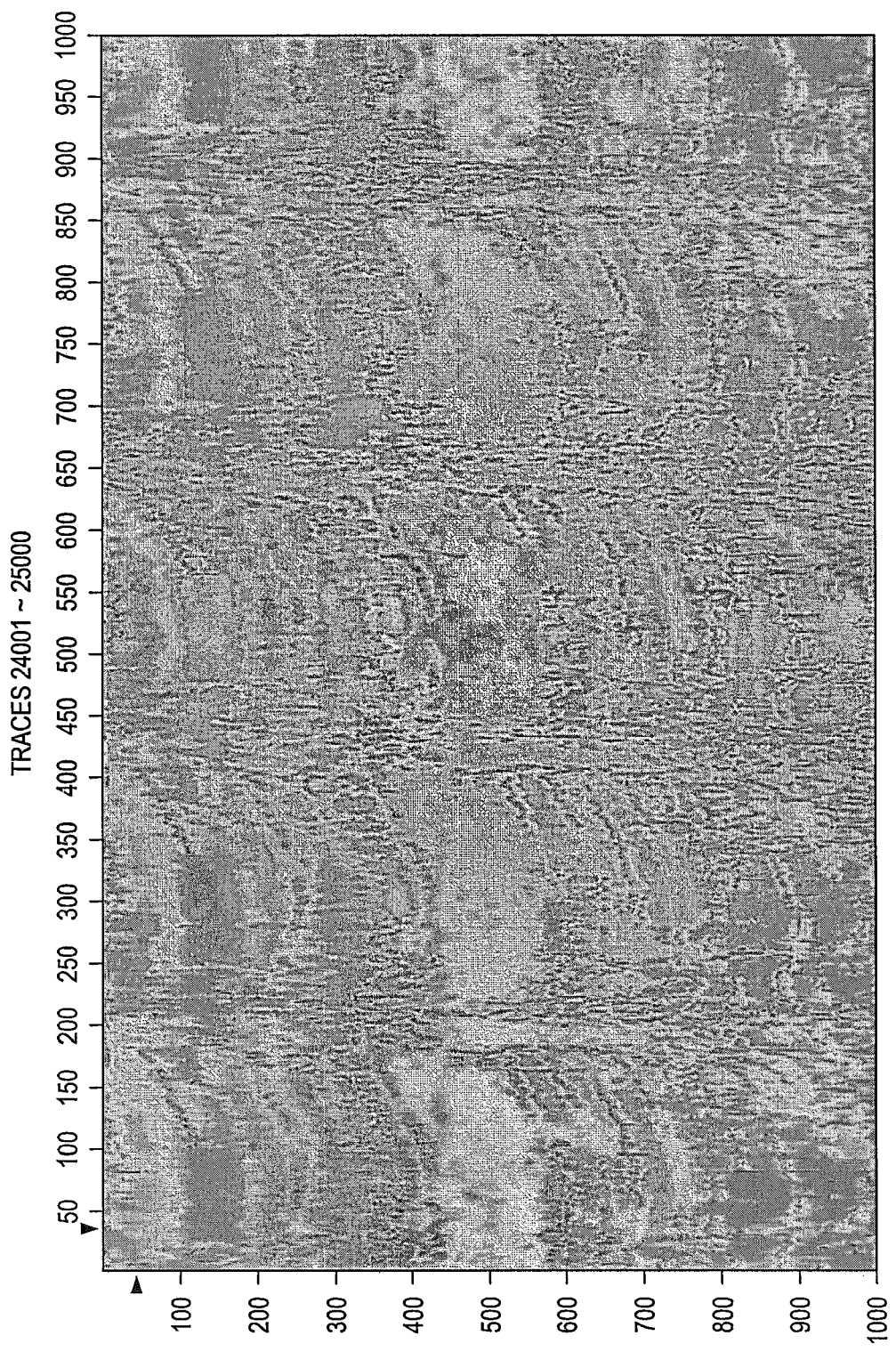
FIG. 11 is a plot of porosity obtained during reservoir properties prediction of subsurface earth formations according to the present invention, and superimposed on the same vertical cross section of subsurface earth formations as FIG. 10.

As a second example, another actual reservoir 3D volume from which eleven seismic attributes had been acquired in a known oil field was the subject of SVM modeling according to the present invention. The eleven attributes were namely: Instantaneous Amplitude, Instantaneous Bandwidth, First Envelope trace derivative, Instantaneous Frequency, Frequency Weighted Envelope, Normalized Amplitude, Instantaneous Phase, Instantaneous Q Factor, Second Envelope trace derivative, Seismic Amplitude and Thin-Bed. The seismic data from the eleven attributes were provided as training inputs. There were also ten wells with porosity values for this reservoir. Acoustic impedance attribute data was not available, and thus three other attributes were chosen after cross-correlation selection. The selected attributes were frequency, normalized amplitude, and phase. A coefficient threshold of 0.1 was used as the rejection threshold. The ten wells were apportioned into 4 subsets for cross-validation. The final $\gamma$ kernel parameter was 1024, and the final penalty parameter C was 1825677 for the SVM modeling. The minimum cross-validation fitting error with the chosen $\gamma$ and C was 0.0049 for the regular porosity value of 0.09~0.11. The predicted porosity reservoir property of porosity is shown in FIG. 11 along a seismic line of profile across an actual reservoir, while the seismic attribute of frequency along the same line is shown in FIG. 10. It is noted that the porosity display of FIG. 11 shows similar structure detail as that of the input attribute of frequency in FIG. 9. Further validation of the prediction may be verified by reservoir simulation or additional well logging data.

With the present invention, SVM modeling has been modified to include regression for the purposes of reservoir properties prediction. As has been set forth, computer processing according to the present invention, includes attributes selection by cross-correlations, data resealing and unification, parameter optimization by way of grid search and cross-validation for RBF kernel; and SVM modeling and predicting.

For the supervised regression problems of hydrocarbon reservoir prediction, there are three advantages of SVM compared with conventional learning methods such as neural network.

SVM is based on the principles of structure risk minimization which makes it avoid over-fitting, and it takes the empirical risk and confidence bound into consideration which make it have superior generalization performance SVM can give a globally optimal solution instead of local optimal solution.

SVM uses kernel machines to solve the nonlinear problems. Non-linear problems in a lower dimensional feature space can always be converted to linear problems in some higher dimensional feature space. And its generalization performance does not depend on the dimensionality of the input space but on the numbers of the training data.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of modeling a reservoir property of subsurface reservoir structure by support vector machine processing in the computer of input data available from the reservoir to form measures of the reservoir property at regions of interest in the subsurface reservoir by regression analysis of the available input data, the method comprising the computer processing steps of:
   (a) receiving training input data about subsurface attributes from seismic survey data obtained from seismic surveys of the reservoir;
   (b) receiving training target data about formation rock characteristics from data obtained from wells in the reservoir;
   (c) partitioning the subsurface attributes training data and the formation rock characteristics training target data into a plurality of subsets;
   (d) selecting formation attribute parameters for support vector machine modeling by performing the steps of:
      (1) cross-validating the subsets of subsurface attributes training data each with the other subsets of the plurality of subsets for a radial based kernel function pair comprising a kernel parameter value and a penalty parameter pair value;
      (2) forming an error function for each of the cross-validated subsets;
      (3) repeating the steps of cross-validating the subsets of subsurface attributes training data and forming an error function for a plurality of different radial based kernel function pairs;
   (e) optimizing the selected formation attribute parameters by determining a minimum error function of the formed error functions for the plurality of different radial based kernel function pairs;
   (f) providing the training data, the selected formation attribute parameters, the cross-validated subsets of subsurface attributes training data, and the error functions for the plurality of radial based function kernel pairs as training inputs for support vector machine modeling;
   (g) performing support vector machine modeling by regression analysis to determine a minimum error function of the error functions of the provided training inputs;
   (h) predicting the reservoir property based on the support vector modeling of the training inputs; and
   (i) forming an output display of the predicted reservoir property.

2. The computer implemented method of claim 1, wherein the computer includes a graphical display device and further including:
   storing a record of the predicted reservoir property.

3. The computer implemented method of claim 1, wherein the reservoir property comprises porosity of a region of interest in the reservoir.

4. The computer implemented method of claim 1, wherein the reservoir property comprises acoustic impedance of a region of interest in the reservoir.

5. The computer implemented method of claim 1, wherein the subsurface attributes of the training input data are selected from the group comprising amplitude, frequency, first envelope data, second envelope data, phase, coherence, bandwidth and acoustic impedance.

6. The computer implemented method of claim 1, wherein the formation rock characteristics of the training target data are selected from the group comprising porosity and acoustic impedance.

7. The computer implemented method of claim 1, wherein the predicted reservoir property comprises porosity.

8. The computer implemented method of claim 1, further including the step of:
   applying the kernel pair to the subsets of subsurface attribute training data.

9. The computer implemented method of claim 1, wherein the step of optimizing the selected formation attribute parameters comprises the step of:
   scaling the training data set and the test data set for each attribute to a value in a defined range in the same scale.

10. A data processing system for modeling a reservoir property of subsurface reservoir structure by support vector machine processing in the computer of input data available from the reservoir to form measures of the reservoir property at regions of interest in the subsurface reservoir by regression analysis of the available input data, the data processing system comprising:
   (a) a processor for performing the steps of:
      (1) receiving training input data about subsurface attributes from seismic survey data obtained from seismic surveys of the reservoir;
      (2) receiving training target data about formation rock characteristics from data obtained from wells in the reservoir;
      (3) partitioning the subsurface attributes training data and the formation rock characteristics training target data into a plurality of subsets;
      (4) selecting formation attribute parameters for support vector machine modeling by cross-correlation of the training input data with the training target data by:
         (i) cross-validating the subsets of subsurface attributes training data each with the other subsets of the plurality of subsets for a radial based kernel function pair comprising a kernel parameter value and a penalty parameter pair value;
         (ii) forming an error function for each of the cross-validated subsets;
         (iii) repeating the steps of cross-validating the subsets of subsurface attributes training data and forming an error function for a plurality of different radial based kernel function pairs;
      (5) optimizing the selected formation attribute parameters; by determining a minimum error function of the formed error functions for the plurality of different radial based kernel function pairs;
      (6) providing the training target data, the selected formation attribute parameters, the cross-validated subsets of subsurface attributes training data, and the error functions for the plurality of radial based function kernel pairs as training inputs for support vector machine modeling;
      (7) performing support vector machine modeling by regression analysis to determine a minimum error function of the error functions of the provided training inputs;
      (8) predicting the reservoir property based on the support vector modeling of the training inputs; and
   (b) a display for performing the step of:
      forming an output display of the predicted reservoir property.

11. The data processing system of claim 10, further including:
   a data memory storing a record of the predicted reservoir property.

12. The data processing system of claim 10, wherein the reservoir property comprises porosity of a region of interest in the reservoir.

13. The data processing system of claim 10, wherein the reservoir property comprises acoustic impedance of a region of interest in the reservoir.

14. The data processing system of claim 10, wherein the subsurface attributes of the training input data are selected from the group comprising amplitude, frequency, first envelope data, second envelope data, phase, coherence, bandwidth and acoustic impedance.

15. The data processing system of claim 10, wherein the formation rock characteristics of the training target data are selected from the group comprising porosity and acoustic impedance.

16. The data processing system of claim 10, wherein the predicted reservoir property comprises porosity.

17. The data processing system of claim 10, wherein the processor further performs the step of:
   applying the kernel pair to the subsets of subsurface attribute training data.

18. The data processing system of claim 10, wherein the processor in optimizing the selected formation attribute parameters performs the step of:
   scaling the training data set and the test data set for each attribute to a value in a defined range in the same scale.

19. A data storage device having stored in a computer readable medium computer operable instructions for causing a data processing system to modeling a reservoir property of subsurface reservoir structure by support vector machine processing in the computer of input data available from the reservoir to form measures of the reservoir property at regions of interest in the subsurface reservoir by regression analysis of the available input data, the instructions stored in the data storage device causing the data processing system to perform the following steps:
   (a) receiving training input data about subsurface attributes from seismic survey data obtained from seismic surveys of the reservoir;
   (b) receiving training target data about formation rock characteristics from data obtained from wells in the reservoir;
   (c) partitioning the subsurface attributes training data and the formation rock characteristics training target data into a plurality of subsets;
   (d) selecting formation attribute parameters for support vector machine modeling by performing the steps of:
      (1) cross-validating the subsets of subsurface attributes training data each with the other subsets of the plurality of subsets for a radial based kernel function pair comprising a kernel parameter value and a penalty parameter pair value;
      (2) forming an error function for each of the cross-validated subsets;
      (3) repeating the steps of cross-validating the subsets of subsurface attributes training data and forming an error function for a plurality of different radial based kernel function pairs;
   (e) optimizing the selected formation attribute parameters by determining a minimum error function of the formed error functions for the plurality of different radial based kernel function pairs;
   (f) providing the training target data, the selected formation attribute parameters, the cross-validated subsets of subsurface attributes training data, and the error functions for the plurality of radial based function kernel pairs as training inputs for support vector machine modeling;
   (g) performing support vector machine modeling by regression analysis to determine a minimum error function of the error functions of the provided training inputs;
   (h) predicting the reservoir property based on the support vector modeling of the training input; and
   (i) forming an output display of the predicted reservoir property.

20. The data storage device of claim 19, wherein the data processing system includes a data memory and the instructions further include instructions causing the data processing system to perform the step of:
   storing a record of the predicted reservoir property.

21. The data storage device of claim 19, wherein the reservoir property comprises porosity of a region of interest in the reservoir.

22. The data storage device of claim 19, wherein the reservoir property comprises acoustic impedance of a region of interest in the reservoir.

23. The data storage device of claim 19, wherein the subsurface attributes of the training input data are selected from the group comprising amplitude, frequency, first envelope data, second envelope data, phase, coherence, bandwidth and acoustic impedance.

24. The data storage device of claim 19, wherein the formation rock characteristics of the training target data are selected from the group comprising porosity and acoustic impedance.

25. The data storage device of claim 19, wherein the predicted reservoir property comprises porosity.

26. The data storage device of claim 19, wherein the instructions further instructions for performing the step of:
   applying the kernel pair to the subsets of subsurface attribute training data.

27. The data storage device of claim 19, wherein the instructions for optimizing the selected formation attribute parameters comprise instructions for performing the step of:
   scaling the training data set and the test data set for each attribute to a value in a defined range in the same scale.

* * * * *

UNITED STATES PATENT AND TRADEMARK OFFICE
CERTIFICATE OF CORRECTION

| | | |
|---|---|---|
| PATENT NO. | : 9,128,203 B2 | Page 1 of 1 |
| APPLICATION NO. | : 13/618327 | |
| DATED | : September 8, 2015 | |
| INVENTOR(S) | : Saleh Al-Dossary et al. | |

It is certified that error appears in the above-identified patent and that said Letters Patent is hereby corrected as shown below:

In the Claims

In Column 13, Line 40, Claim 1, the phrase appears as "training data" and should read --training target data--.

In Column 16, Line 21, Claim 19, the second to last word appears as "input;" and should read --inputs;--.

Signed and Sealed this
Nineteenth Day of January, 2016

Michelle K. Lee
*Director of the United States Patent and Trademark Office*